United States Patent [19]

Kaijala

[11] Patent Number: 6,018,992
[45] Date of Patent: Feb. 1, 2000

[54] POSITION SENSOR HAVING TERMINATION CLIP

[75] Inventor: Murray Kaijala, Elkhart, Ind.

[73] Assignee: CTS Corporation, Elkhart, Ind.

[21] Appl. No.: 09/232,322

[22] Filed: Jan. 18, 1999

[51] Int. Cl.[7] ............................................. G01M 15/00
[52] U.S. Cl. .......................................................... 73/118.1
[58] Field of Search ............................. 73/118.1; 338/68, 338/118, 125, 127–130, 132, 160, 162, 167, 184; 123/399

[56] References Cited

U.S. PATENT DOCUMENTS

| | | |
|---|---|---|
| 3,643,198 | 2/1972 | Economu . |
| 4,213,112 | 7/1980 | Alman et al. . |
| 4,334,352 | 6/1982 | VanBenthuysen . |
| 4,430,634 | 2/1984 | Hufford et al. . |
| 4,435,691 | 3/1984 | Ginn . |
| 4,616,504 | 10/1986 | Overcash et al. . |
| 4,688,420 | 8/1987 | Minagawa . |
| 4,703,649 | 11/1987 | Eitoku et al. . |
| 5,039,975 | 8/1991 | Ishihara . |
| 5,133,321 | 7/1992 | Hering et al. . |
| 5,321,980 | 6/1994 | Hering et al. . |
| 5,385,068 | 1/1995 | White et al. . |
| 5,415,144 | 5/1995 | Hardin et al. . |
| 5,416,295 | 5/1995 | White et al. . |
| 5,460,035 | 10/1995 | Pfaffenberger . |
| 5,889,461 | 3/1999 | Ebata . |

*Primary Examiner*—Robert Raevis
*Attorney, Agent, or Firm*—Alvin R. Wirthlin; Mark P. Bourgeois

[57] ABSTRACT

A position sensor according to the invention comprises a housing having an internal compartment, a terminal support web extending into the compartment, at least one terminal having a first end in contact with the terminal support web and a second end extending outwardly of the housing, a sensor element located within the internal compartment, and a connector clip. The sensor element includes a terminal portion adapted for contacting the at least one terminal. The clip comprises a bight section, at least one first finger extending from the bight section, and at least one second finger extending from the bight section opposite the first finger. The first and second fingers are adapted to receive the sensor element and the support web therebetween when the clip is installed for holding the terminal portion against the at least one terminal.

19 Claims, 3 Drawing Sheets

POSITION SENSOR HAVING TERMINATION CLIP

BACKGROUND OF THE INVENTION

1. Field of the Invention

This invention relates to position sensors, and more particularly to a position sensor with a resistive strip and a termination clip for connecting the resistive strip to an electrical terminal.

2. Description of the Related Art

Prior art throttle position sensors, such as disclosed in U.S. Pat. Nos. 5,321,980 and 5,133,321 to Hering et al. and U.S. Pat. Nos. 5,416,295 and 5,385,068 to White et al., the disclosures of which are hereby incorporated by reference, typically include an external housing with a sensor substrate and rotor positioned in the housing.

FIG. 1 is an assembly view of a prior art throttle position sensor 16 exploded along line 34. The sensor 16 comprises an external housing 50, a seal 52, a screened film substrate or sensor element 54, a termination wedge 56, a rotor 58, a spring 60, and a cover 62. Terminals (not shown) extend from within a connector portion 48 to the interior of the housing 50. The terminals within the housing 50 are supported by a web 64. An electrical cable with a corresponding number of conductors (not shown) interconnects with the terminals at the connector portion to thereby electrically connect the terminals to an electronic fuel control system (not shown). The screened film substrate 54 includes a resistive element 66, an idle conductive element 68, and a throttle conductive element 70 that are etched onto the substrate 54. A nonconductive portion 69 separates the idle and throttle conductive elements. A rotor 58 includes a throttle wiper 72 and an idle/throttle validation wiper 74.

In assembly of the sensor 16, the seal 52 is first inserted within the housing 50. The substrate 54 is then positioned in the housing such that a flat portion 76 of the substrate rests adjacent the web 64 with the elements 66, 68 and 70 facing inward. The substrate 54 includes additional electrical traces (not shown) for coupling the elements 66, 68 and 70 to suitable terminal contact points (not shown) on the flat portion 76. The termination wedge 56 is then inserted between the flat portion 76 of the substrate 54 and a wall 65 of the housing 50 to thereby press the substrate against the web 64 and interconnect the elements 66, 68 and 70 of substrate 54 to the terminals supported by the web 64. Electrical coupling between individual conductors of the cable and portions of the substrate 54 is thereby established by the wedge 56. The rotor 58 is then installed in the housing 50 such that the wiper 72 contacts element 66 and wiper 74 contacts a first portion 69 or one of the elements 68 or 70. The spring 60 is then coupled between the rotor 58 and housing 50 to bias the rotor toward a full return position. The cover 62 is finally attached to the housing 50 to rotatably support the rotor 58 and to seal the entire assembly.

The termination wedge 56 in the above-described arrangement applies a force against the web 64 and causes it to deflect. Microcracks and/or stress hardening in the web may occur and lead to early failure of the sensor, especially when subject to vibration, as is common in automotive applications. The termination wedge 56 is also difficult to install since the flat portion 76 of the substrate 54 is initially unrestrained when inserted into the housing 50. Moreover, the relatively high contact point of the wedge 56 on the flat portion 76 leaves little room for routing traces on the substrate.

Other prior art position sensors using sensor substrates include U.S. Pat. No. 5,460,035, U.S. Pat. No. 5,415,144, U.S. Pat. No. 5,039,975, U.S. Pat. No. 4,703,649, U.S. Pat. No. 4,688,420, U.S. Pat. No. 4,616,504, U.S. Pat. No. 4,435,691, U.S. Pat. No. 4,430,634, U.S. Pat. No. 4,334,352, and U.S. Pat. No. 3,643,198, the disclosures of which are hereby incorporated by reference.

SUMMARY OF THE INVENTION

A position sensor according to the invention comprises a housing having an internal compartment, a terminal support web extending into the compartment, at least one terminal having a first end in contact with the terminal support web and a second end extending outwardly of the housing, a sensor element located within the internal compartment, and a connector clip. The sensor element includes a terminal portion adapted for contacting the at least one terminal. The clip comprises a bight section, at least one first finger extending from the bight section, and at least one second finger extending from the bight section opposite the first finger. The first and second fingers are adapted to receive the sensor element and the support web therebetween when the clip is installed for holding the terminal portion against the at least one terminal. Preferably, the first and second fingers are biased toward each other and each finger includes a free end that extends outwardly from the opposite finger to thereby facilitate installation of the clip over the sensor element and support web.

At least one guide rib can be provided that extends into the compartment adjacent the support web. A space between the guide rib and support web is adapted to receive the terminal portion of the sensor element. The at least one guide rib may include an upper side edge that slopes downwardly toward the support web for guiding the terminal portion into the compartment and toward the support web and a lower side edge that extends generally parallel to the support web for locating the terminal portion at least adjacent the support web.

There has thus been outlined, rather broadly, the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as of basis for designing other structures, methods and systems for carrying out the several purposes of the present invention. It is important, therefore, that the claims are regarded as including such equivalent constructions since they do not depart from the spirit and scope of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
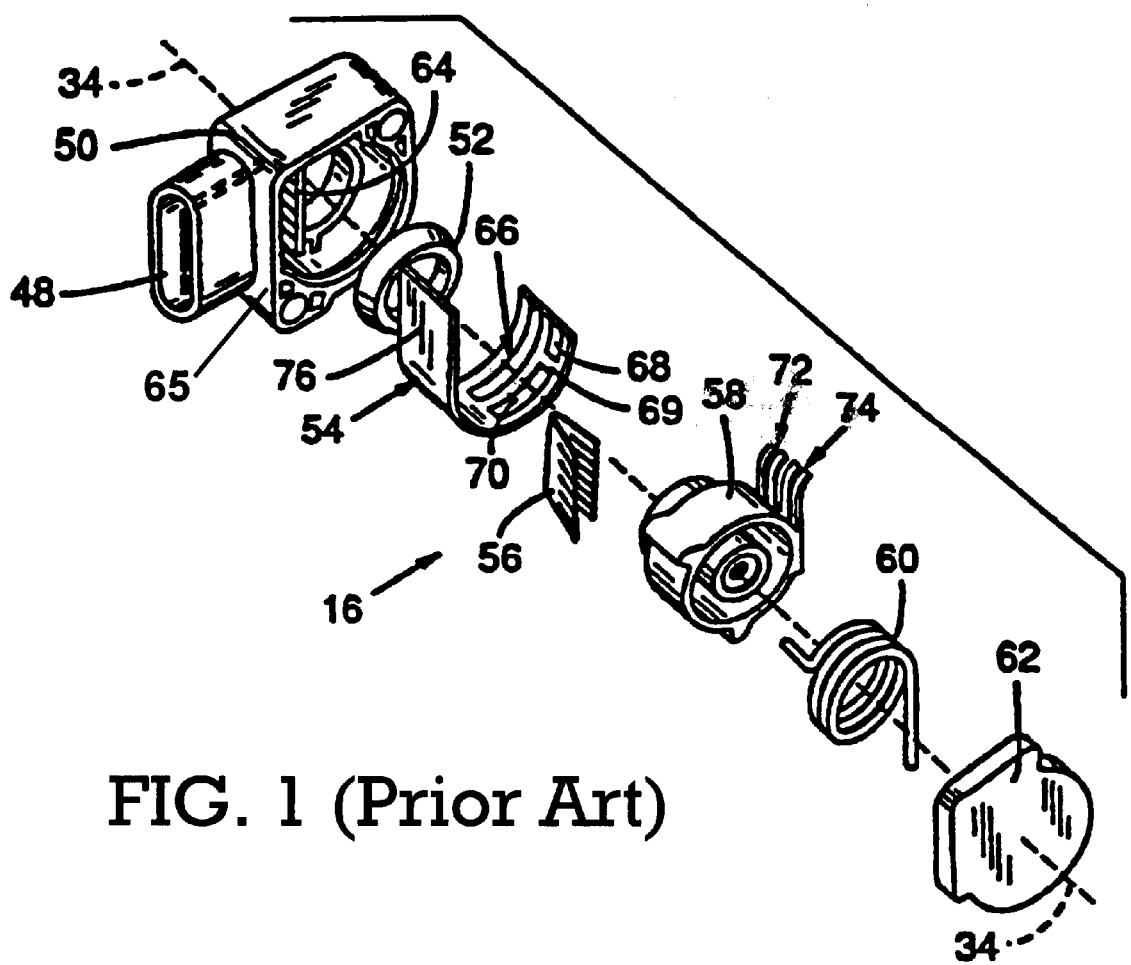
FIG. 1 is an exploded orthogonal view of a prior art position sensor.
Figure 2:
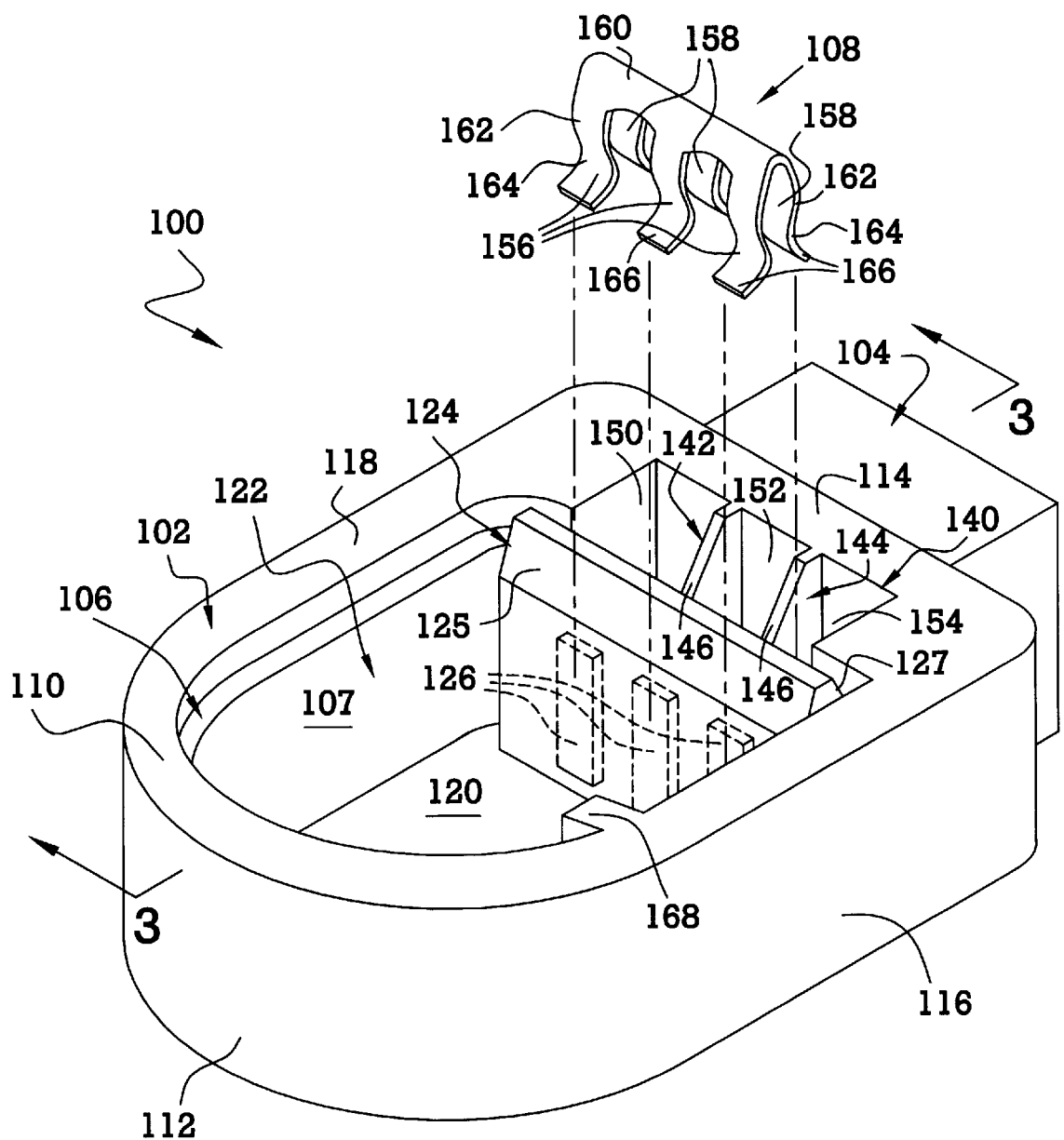
FIG. 2 is an orthogonal view of a portion of a position sensor according to the present invention.
Figure 3:
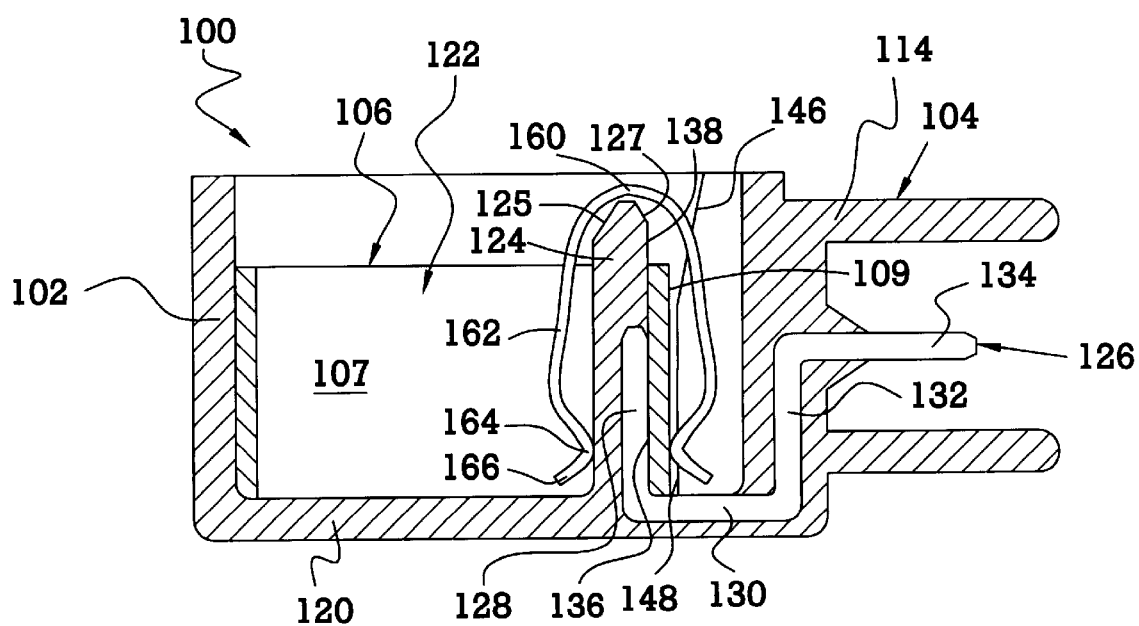
FIG. 3 is a cross section of the position sensor of FIG. 2 taken along line 3—3 of FIG. 2.

With reference now to FIGS. 2 and 3, an improved position sensor 100 according to the invention is shown, wherein portions of the sensor not pertaining to the invention, such as the rotor, spring, and cover, have been left out for purposes of clarity. The position sensor 100 includes a housing 102, a connector block 104 extending rearwardly from the housing, a sensor element 106 adapted for installation into the housing, and a termination clip 108 also adapted for installation into the housing. The sensor element 106 is typically constructed of a flexible polyimide sheet and includes one or more screened-printed resistor tracts (not shown) on an inwardly facing surface 107 thereof and one or more electrically conductive traces (not shown) at a terminal portion 109 thereof.

The housing has a continuous wall 110 with a forward wall portion 112 connected to a rearward wall portion 114 by a pair of side wall portions 116 and 118. A bottom wall 120 is integrally formed with the continuous wall 110 to form an interior chamber 122. The connector block 104 is preferably formed integrally with the rearward wall portion 114. A termination web 124 is formed integrally with the bottom wall 120 and extends upwardly therefrom. Preferably, the termination web 124 is oriented substantially perpendicular to the bottom wall 120. A pair of converging slanted surfaces 125 and 127 are formed at an upper free end of the web 124.

A plurality of conductive terminals 126 are preferably integrally molded with the housing 102 through well known insert-molding techniques. Although three terminals 126 are shown in FIG. 2, it is to be understood that more or less terminals may be provided depending on the particular configuration of the sensor element 106. Each terminal 126 includes a first leg 128 integrally molded with the web 124, a bight portion 130 integrally with the bottom wall 120, a second leg 132 integrally molded with the rearward wall portion 114, and a third leg portion 134 that extends outwardly from the rearward wall portion and into the interior of the connector block 104. Preferably, the first and second legs of each terminal 126 extend perpendicularly from the bight portion 130 while the third leg 134 extends perpendicularly from the second leg 132. A rear surface 136 of the first leg 128 is preferably flush with a rear surface 138 of the web 124.

A channel 140 is formed in the rearward wall portion 114. A pair of ribs 142 and 144 are integrally formed with the rearward wall portion and extend into the channel 140. An upper side edge 146 of each rib 142, 144 slopes downwardly toward the termination web 124, while a lower side edge 148 of each rib 142, 144 extends adjacent to and substantially parallel with the rear surface 138 of the web 124. The ribs 142 and 144 divide the channel into three sections 150, 152, and 154. The number of sections preferably corresponds to the number of terminals 126, with each terminal being aligned with one of the sections.

The termination clip 108 is preferably constructed of a 0.007 in. thick 301 stainless-steel material that has been spring-tempered. The termination clip 108 includes a bight portion 160 which connects a set of first fingers 156 to an opposing set of second fingers 158. Each finger 156 is aligned with an opposing finger 158 to form a plurality of finger pairs. Each finger pair is adapted for alignment with one of the channel sections 150, 152 and 154 and its corresponding terminal 126 when the clip 108 is installed in the housing. Each finger 156, 158 has an upper portion 162 that curves generally outwardly or away from its respective opposing finger and a lower portion 164 that curves generally inwardly toward its opposing finger. A free end 166 below the curved portions 164 of each finger is flared free to thereby facilitate installation of the clip 108 over the web 124 and sensor element 106. Preferably, the number of fingers corresponds to the number of terminals 126.

During installation, the sensor element 106 is inserted into the interior chamber 122 of the housing 102. A tab 168 projects into the interior chamber 122 from the side wall portion 116 and serves as a stop for the sensor element 106 during the installation. The upper side edge 146 of the ribs 142, 144 forces the terminal portion 109 of the sensor element 106 toward the rear surface 128 of the web 124. When the sensor element 106 is installed, the lower side edge 148 of each rib constrains the terminal portion 109 of the sensor element against the first leg 128 of the terminals 126 prior to installation of the clip 108. The clip 108 is then installed by aligning each pair of fingers 156, 158 with its respective channel section. The clip is then pushed over the web 124 and the sensor element 106 until it reaches the final position as shown in FIG. 3. In this position, the fingers 158 press the sensor element 106 against the terminals 126. The flared free ends 166 of the clip 108, together with the slanted upper surfaces 125, 127 of the web 124, facilitate installation of the clip.

With this arrangement, the lower portions 164 of the fingers hold the sensor element 106 against the web 124 without creating bending stresses in the web as with the termination wedge of the prior art. Since only one set of fingers is positioned between the web 124 and the rearward wall portion 114, the space between the web and the rearward wall portion can be made smaller than required by the prior art to thereby reduced the overall size of the sensor 100. Moreover, since the point of contact between the clip 108 and the sensor element 106 is relatively low when compared to the prior art wedge arrangement, more room is available on the sensor element 106 to route conductive traces. The clip 108 also serves to axially retain the terminal portion 109 of the sensor element 106 within the interior chamber 122 of the housing 102. When the cover (not shown) is installed, any contact of the cover with the clip 108 would be less likely to affect termination forces against the web and sensor element as in the prior art termination wedge. The particular configuration of the clip 108 also makes it ideal for track feeding during assembly, since no re-orientation of the clip is required.

It is to be understood that the terms forward, rearward, upward, downward, etc., and their respective derivatives as used herein are intended to describe relative, rather than absolute directions and/or positions.

While the invention has been taught with specific reference to these embodiments, someone skilled in the art will recognize that changes can be made in form and detail without departing from the spirit and the scope of the invention. The describe embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A position sensor, comprising:
   a) a housing having an internal compartment;
   b) a terminal support web extending into the compartment;

c) at least a first terminal having a first end in contact with the terminal support web and a second end extending outwardly from the housing;

d) a sensor element located within the internal compartment, the sensor element including a terminal portion adapted for contacting the first terminal; and e) a clip, comprising: a bight section, at least one first finger extending from the bight section, and at least one second finger extending from the bight section opposite the first finger, the first and second fingers being adapted to receive the sensor element and the support web therebetween when the clip is installed for holding the terminal portion against the first terminal.

2. A position sensor according to claim 1, wherein the first and second fingers include a free end that extends outwardly from the opposite finger to thereby facilitate installation of the clip over the sensor element and support web.

3. A position sensor according to claim 2, wherein the first and second fingers engage a lower portion of one of the support web and sensor element.

4. The position sensor according to claim 1, wherein a distance between the first and second fingers in an uninstalled state is less than a combined thickness of the support web and sensor element.

5. The position sensor according to claim 4, wherein the first and second fingers are biased toward each other.

6. A position sensor according to claim 1, further comprising at least one guide rib extending into the compartment adjacent the support web, a space between the guide rib and support web being adapted to receive the terminal portion of the sensor element.

7. A position sensor according to claim 6, wherein the at least one guide rib includes an upper side edge that slopes downwardly toward the support web for guiding the terminal portion into the compartment and toward the support web during installation of the sensor element in the compartment.

8. A position sensor according to claim 7, wherein the at least one guide rib further includes a lower side edge that extends generally parallel to the support web for locating the terminal portion at least adjacent the support web.

9. A positioned sensor, comprising:

a) a housing having an internal compartment;

b) a terminal support web extending into the compartment;

c) a plurality of terminals, each terminal having a first end in contact with the terminal support web and a second end extending outwardly from the housing;

d) a sensor element, located within the internal compartment, including a terminal portion adapted for contacting the plurality of terminals; and e) a clip, including: a bight section, a first set of fingers extending from the bight section, and a second set of fingers extending from the bight section opposite the first set, the first and second sets being adapted to receive the sensor element and the support web therebetween when the clip is installed thereby holding the terminal portion against the plurality of terminals.

10. A position sensor according to claim 9, wherein each finger includes a free end that extends outwardly from the opposite finger to thereby facilitate installation of the clip over the sensor element and support web.

11. A position sensor according to claim 10, wherein the first and second sets of fingers engage a lower portion of one of the support web and sensor element.

12. The position sensor according to claim 9, wherein a distance between the first and second sets of fingers in an uninstalled state is less than a combined thickness of the support web and sensor element.

13. The position sensor according to claim 12, wherein the first and second sets of fingers are biased toward each other.

14. A position sensor according to claim 9, further comprising at least one guide rib extending into the compartment adjacent the support web, a space between the guide rib and support web being adapted to receive the terminal portion of the sensor element.

15. A position sensor according to claim 14, wherein the at least one guide rib includes an upper side edge that slopes downwardly toward the support web for guiding the terminal portion into the compartment and toward the support web during installation of the sensor element in the compartment.

16. A position sensor according to claim 15, wherein the at least one guide rib further includes a lower side edge that extends generally parallel to the support web for locating the terminal portion at least adjacent the support web.

17. A position sensor according to claim 15, wherein the at least one guide rib extends between adjacent fingers of one of the first and second sets of fingers.

18. A position sensor according to claim 17, wherein each finger of the one set of fingers is in alignment with one of the terminals.

19. A position sensor according to claim 17, wherein one of the sets of first and second sets of fingers has a number of fingers that corresponds to the number of terminals, and further wherein each finger of the one set of fingers is in alignment with one of the terminals.

* * * * *